United States Patent [19]
Cook

[11] Patent Number: 5,457,444
[45] Date of Patent: Oct. 10, 1995

[54] SWITCHING MECHANISM

[75] Inventor: David L. Cook, Rangiora, New Zealand

[73] Assignee: PDL Holdings Limited, Christchurch, New Zealand

[21] Appl. No.: 917,862

[22] Filed: Jul. 21, 1992

[30] Foreign Application Priority Data

Jul. 22, 1991 [NZ] New Zealand .............................. 239076
Apr. 15, 1992 [NZ] New Zealand .............................. 242376

[51] Int. Cl.$^6$ .................................................. H01H 73/00
[52] U.S. Cl. ................................................ 335/18; 361/42
[58] Field of Search ........................ 335/18; 361/42–50

[56] References Cited

U.S. PATENT DOCUMENTS 4,630,015  12/1986  Gernhardt et al. ........................ 335/18
4,719,437  1/1988  Yun .......................................... 335/18

Primary Examiner—Lincoln Donovan
Attorney, Agent, or Firm—Ladas & Parry

[57] ABSTRACT

A switch mechanism opens a contact set in the event of an undervoltage condition. The mechanism involves a lever assembly biased by a spring for pivoting about one or other of two fulcrums to open or close the contacts respectively. The undervoltage causes a solenoid to release a plunger which initiates operation about a fixed fulcrum. A reset device is used manually to initiate operation about a movable fulcrum, provided that the voltage is sufficient. An arm is deflected by the plunger to shift the movable fulcrum and also acts to restore the plunger during reset. The switch mechanism may be incorporated in a residual current device which provides the undervoltage condition on detecting an electrical fault.

9 Claims, 10 Drawing Sheets

5,457,444

SWITCHING MECHANISM

BACKGROUND OF THE INVENTION

This invention relates to a switch mechanism and more particularly to a residual current device (RCD) incorporating the mechanism.

An RCD is a safety device which cuts power to an electrical appliance or other load in the event of certain faults. The device senses current imbalance between active and neutral power conductors resulting from earth currents created by the faults. A differential transformer generates an out of balance signal which is electronically amplified and compared with a predetermined threshold. Exceeding the threshold disables a switch mechanism and opens a contact set to cut the power. Several switch mechanisms are known but most are too expensive or bulky or otherwise unsuitable for general use.

Switches having a lever assembly which pivots about one or other of two fulcrums to open or close the contact set as in the present invention are disclosed in U.S. Pat. No. 4,010,431 Virani et-al, U.S. Pat. No. 4,034,266 Virani et-al, and U.S. Pat. No. 4,209,762 Samborski et-al. Reset is achieved in these cases however by pushing down on the close fulcrum rather than on the lever. In U.S. Pat. No. 3,813,579 Doyle et-al, a reset device pushes on the lever but also provides the open fulcrum rather than having independent pivot and reset action. In all of these cases a solenoid is energised to expel a plunger and trip the switch rather than being de-energised to simply release the plunger under bias from a spring. U.S. Pat. No. 4,567,456 Legatti, discloses a simple plunger release but there is no double pivoting action of a lever and the solenoid is required to maintain bending of a flexible arm. In each known case the plunger is restored by the solenoid itself or on reset, rather than almost immediately after release during pivoting of the lever.

SUMMARY OF THE INVENTION

It is an object of the present invention to provide a cheaper and more compact switch mechanism for RCDs or at least to provide the public with a useful choice.

Accordingly in one aspect the invention may be said to consist in a switch mechanism that is opened by an undervoltage condition in the event of an electrical fault, wherein movable contact means from a contact set is supported on a lever assembly with a force exerted upon the lever assembly between two fulcrum positions, only one of which is operable with the lever assembly at a time and in a manner that movement about one fulcrum position causes the contact set to close, and movement about the second fulcrum position causes the contact set to open, the first fulcrum position movable by an electromechanical device in response to the undervoltage condition to become inoperable allowing the lever assembly to move and operate about the second fulcrum position thereby opening the contact set, the lever assembly movable by a manual reset device so that under a normal voltage condition the second fulcrum position becomes inoperable and the lever assembly moves to operate about the first fulcrum position thereby closing the contact set.

Preferably the electromechanical device comprises a solenoid and plunger, the plunger being released to move the first fulcrum position when the solenoid is de-energised and then being restored by operation of the lever assembly about the second fulcrum position during opening of the contacts.

Preferably an indicator is mounted on the lever assembly so that the open or closed state of the contact set is apparent.

In a further aspect the invention may be said to consist in a residual current device incorporating a switch mechanism according to the preceding paragraphs.

DESCRIPTION OF THE DRAWINGS

General principles of the invention and a preferred embodiment will be described with reference to the accompanying drawings of which.

DETAILED DESCRIPTION OF THE PREFERRED EMBODIMENT

Figure 1:
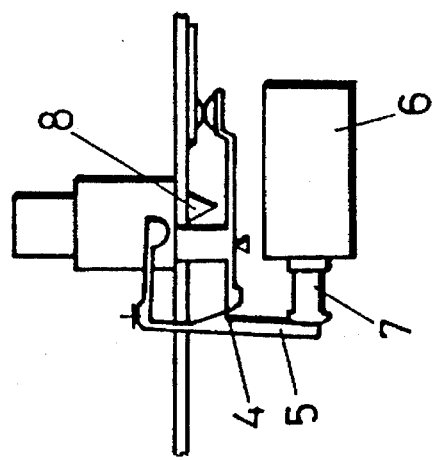
FIG. 1 is a diagrammatic representation of the switch mechanism with the contact set closed.

Referring to these drawings, FIGS. 1 to 8 are intended to demonstrate the general principles of a switch mechanism according to the invention. FIGS. 9 to 17 show how a preferred embodiment of the mechanism may be incorporated in an RCD. The switch is normally open until mains power is applied to energise an electromechanical device such as a solenoid. Manually operating a reset device, such as a push button, then closes the contact set and provides power to a load. If mains power is removed or if a control circuit detects an out of balance current flow, the solenoid is de-energised to trip a lever system and the contacts spring open.

As shown in FIGS. 1 to 6, the contact set comprises a fixed contact 1 mounted on an appropriate support and a movable contact 2 mounted on a lever arm 3. The lever is able to pivot about either of a first fulcrum position 4 on swing arm 5 or a second fulcrum position 8 on the support. Spring 9 provides a force on the lever between the fulcrums and causes the pivoting when required to open or close the contacts. A sufficient voltage applied to solenoid 6 holds plunger 7 from acting on arm 5. On an undervoltage condition the plunger is released to disengage fulcrum 4 from lever 3 and allow the lever to pivot about fulcrum 8. Button 10 is mounted on the support and pushes on lever 3 through shaft 101 to move the lever away from fulcrum 8 and allow pivoting about fulcrum 4 in resetting the mechanism. Arms 42 and 43 extend from lever 3 and arm 5 respectively, and interact to restore the plunger within the solenoid during pivoting of the lever about fulcrum 8.

Referring to FIG. 1, the contact set is shown closed in a no fault working condition of the switch. Spring 9 pushes one end of lever 3 against fulcrum 4 and at the other end contact 2 is pushed against contact 1. There is a clearance between lever 3 and fulcrum 8. Plunger 7 is held in solenoid 6 against a bias spring by a voltage derived from the mains.

Figure 2:
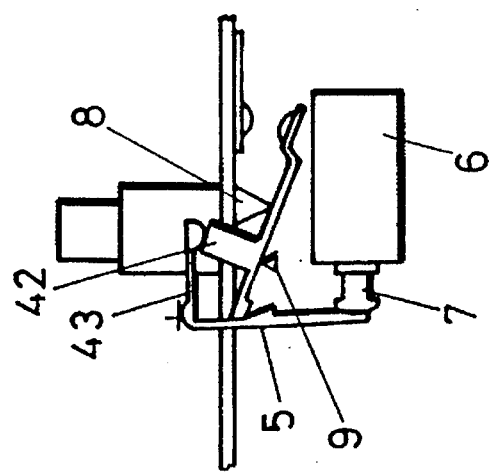
FIG. 2 shows the beginning of an undervoltage release of the lever assembly from the first fulcrum position.

Referring to FIG. 2, initial movement of the mechanism is shown on occurrence of a fault. The voltage to solenoid 6 has been dropped and plunger 7 is ejected by the bias spring to deflect swing arm 5. This disengages fulcrum 4 from lever 3.

Figure 3:
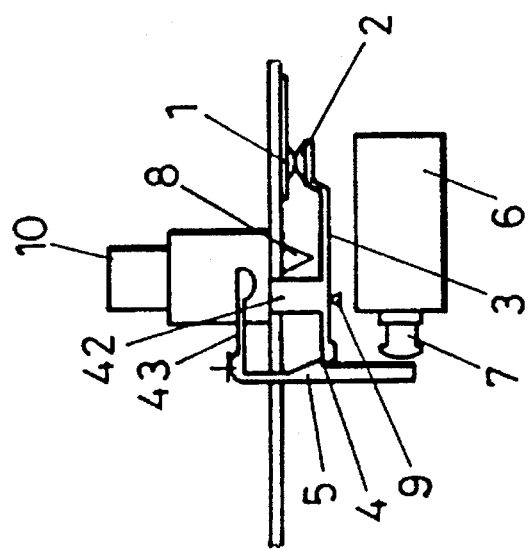
FIG. 3 shows movement of the lever to pivot about the second fulcrum position.

Continuing the movement as shown in FIG. 3 opens the contact set. Spring 9 pushes lever 3 towards fulcrum 8 about which the lever pivots. This separates the contacts breaking current to the load. Arms 42 and 43 have moved together.

Figure 4:
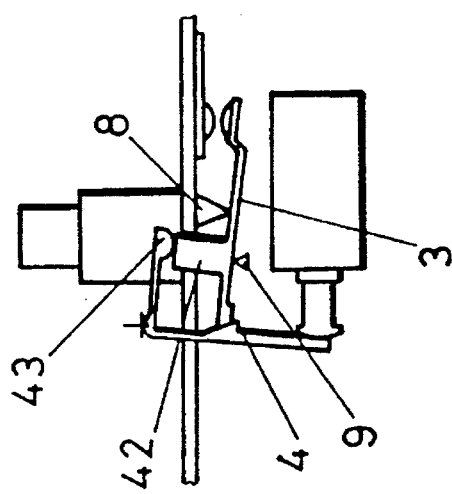
FIG. 4 shows the contact set open.

In FIG. 4, the contact set is shown fully open. Lever 3 has pivoted to maximum about fulcrum 8. Arm 42 on lever 3 has pushed arm 43 on swing arm 5 past the position of FIG. 1 and restored plunger 7 within the solenoid. This action reduces the size and cost of the solenoid required. The plunger is pushed against the solenoid bias spring indirectly by spring 9.

Figure 5:
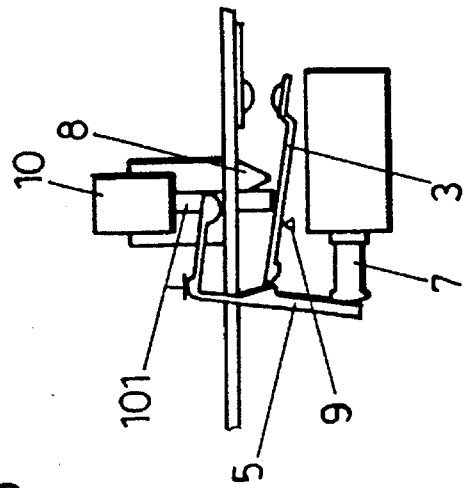
FIG. 5 shows the beginning of a reset operation in an undervoltage condition.

Referring to FIG. 5, a reset operation is shown attempted with the solenoid de-energised. For example, there may be low mains voltage or an active or neutral open circuit on the line side of the contacts. Arm 42 is omitted for clarity. As button 10 reciprocates, shaft 101 pushes lever 3 away from fulcrum 8 against spring 9. Plunger 7 is correspondingly released from solenoid 6 deflecting swing arm 5 so that fulcrum 4 cannot engage the lever. This simply returns the mechanism to the state of FIG. 4 on releasing the button.

Figure 6:
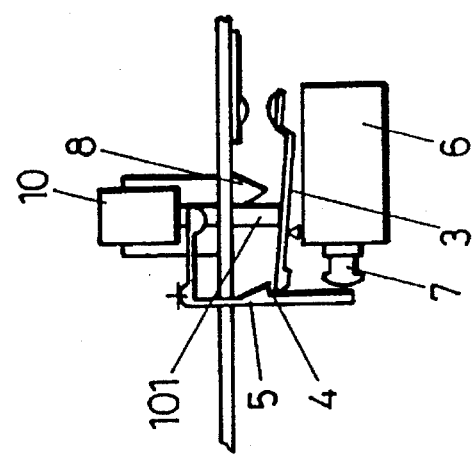
FIG. 6 shows the reset operation nearly complete in a normal voltage condition.

In FIG. 6 a reset becomes possible as the solenoid is energised by a normal voltage. On pushing lever 3 away from fulcrum 8, plunger 7 now remains held in solenoid 6. The lever slides over fulcrum 4 and swing arm 5 is maintained in a position for their engagement. Pressure on button 10 is removed and spring 9 pushes lever 3 to engage fulcrum 4 at one end, followed by pivoting to close the contact set. This returns the mechanism to the state of FIG. 1. In an RCD if a fault on the load side remains, the solenoid will be de-energised and the switch will immediately trip after resetting.

Figure 8:
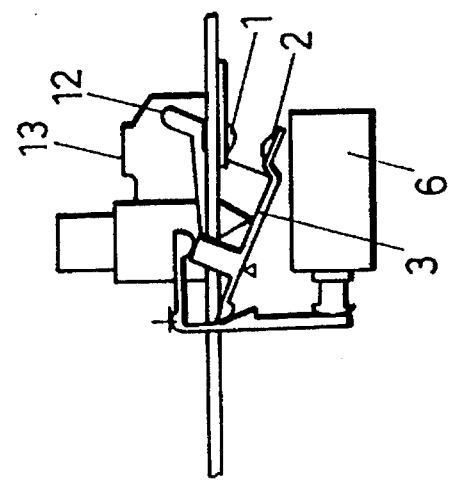
FIG. 8 shows the indicator of FIG. 7 with the contact set open.
Figure 7:
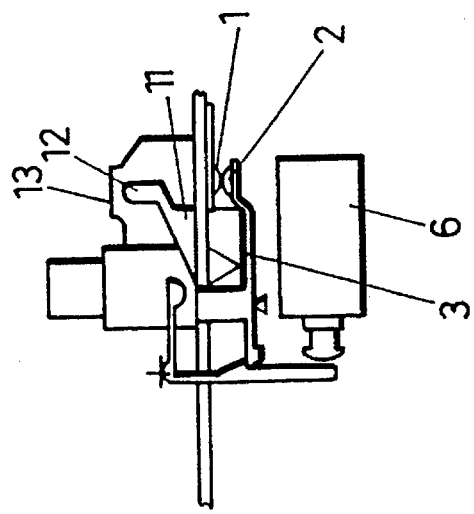
FIG. 7 shows the switch mechanism and an indicator with the contact set closed.

FIGS. 7 and 8 show a means which indicates whether power is being supplied to the load. An arm 11 is mounted on lever 3 and carries a flag 12 which is visible in opening 13 when contacts 1 and 2 are closed. On a fault the lever pivots to open the contacts and moves the flag to a less visible position, making it apparent that the fault has occurred.

Figure 9:
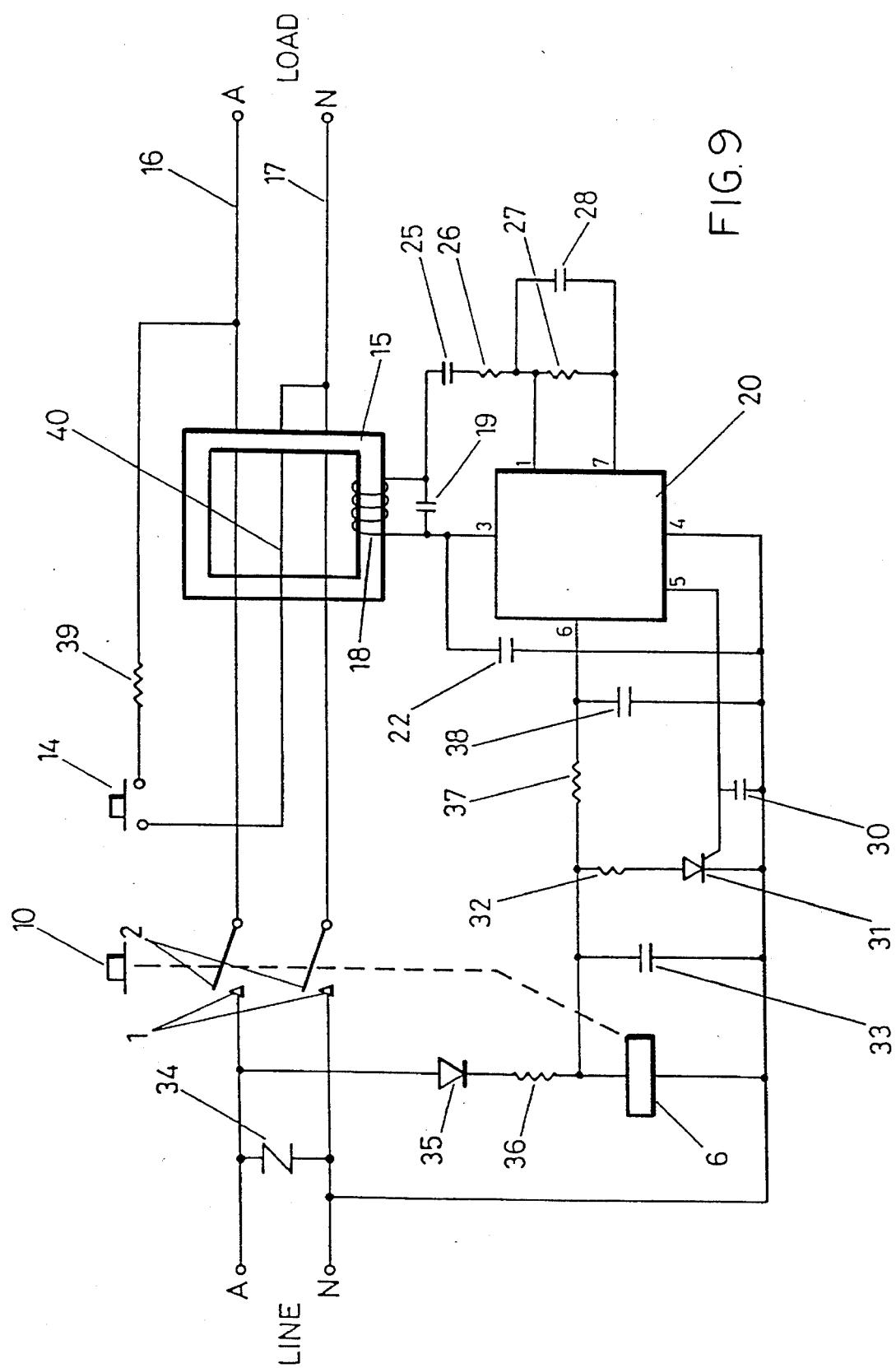
FIG. 9 is an example RCD circuit which may incorporate the switch mechanism.

FIG. 9 shows a control circuit which could be used with the switch mechanism of FIGS. 1 to 8 in an RCD. This is based on a Raytheon RV4145 ground fault interrupter integrated circuit 20. A differential toroidal transformer 15 has mains active and neutral conductors 16 and 17 passing centrally through a core over which is wound a secondary winding 18 of high inductance. The conductors are effectively anti-phased primary windings such that normal load currents cancel each other resulting in zero output voltage from the secondary winding. An output voltage is developed when a small residual current from the load active flows back to line neutral indirectly, usually via ground, from a faulty appliance or cable connected in the load.

A metal oxide varistor 34 is provided to limit peak mains transients from causing damage to the circuit or any attached appliance. Power is supplied to the circuit by a half wave rectifier 35 and current limiting resistor 36. Capacitor 36 is charged and applies a voltage to solenoid 6 which retains plunger 7 so that contacts 1, 2 can be closed. Action of the plunger in the switch mechanism is indicated by the dashed line. As IC 20 draws very little quiescent current, resistor 37 is used as a simple voltage dropper, with capacitor 38 provided as a precaution against electrical noise problems rather than as a supply filter.

One end of coil 18 is connected to IC 20 at pin 3 which is a common amplifier reference point. Capacitor 19 filters high frequency noise from the secondary voltage, while capacitor 22 provides noise bypassing from the bulk of the coil to IC 20 at ground pin 4. The active end of coil 18 is connected to an amplifier summing junction at pin 1 through capacitor 25 and resistor 26. Resistors 27 and 26 determine the amplifier gain while capacitor 25 series resonates with the coil inductance and is designed to extract mains frequency signal components from loads which use half wave power control. Otherwise the core would saturate from the resulting DC and product very little output to trip the switch. Capacitor 28 provides amplifier high frequency roll off.

The amplifier output is internally connected to comparators which are referenced to zener diodes in IC 20. When the amplified signal detected on pin 1 exceeds the zener thresholds, an output signal at pin 5, filtered by a capacitor 30, triggers a silicon controlled rectifier 31. The SCR 31 latches via the current limiting resistor 32 and temporarily discharges capacitor 33 creating an undervoltage condition on solenoid 6. This releases plunger 7 to cause opening of the contacts, turning off power to the load. Capacitor 33 then recharges to allow closing of the contacts in a reset operation.

A circuit test means is provided by which unbalanced current is passed through the transformer core to check action of the switch. Button 14 is pressed to complete a link between the active and neutral conductors, taking a portion of the active current determined by resistor 39 through the transformer twice. This simulates a residual current flowing from the neutral conductor and escaping to earth.

FIGS. 10 to 17 show a preferred switch mechanism using the principles outlined with respect to FIGS. 1 to 8, incorporated in an RCD. Most of the circuit components outlined with respect to FIG. 9 have been omitted for clarity. The RCD structure is built around a printed circuit board 50 and plastics casing elements 51, 52 clipped together at 53, 54, 55. Using references as in FIGS. 1 to 8 the structure comprises two pairs of contacts 1 and 2, lever assembly 3, first fulcrum means 4 on swing arm 5, solenoid 6 and plunger 7, second fulcrum means 8, lever pivoting spring 9, reset means 10, extensions 42 and 43 on lever 3 and arm 4 respectively, indicator arm 11, flag 12 and view opening 13. This structure also shows spring 70 which ejects plunger 7 from solenoid 6 and spring 71 which ensures proper latching of fulcrum 4 on lever 3. Using references as in FIG. 9 the structure comprises differential transformer 15, active and neutral conductors 16, 17, test means 14 and conductor 40. In fixing the RCD between mains and a load, the conductors are connected at terminals 60, 61 and 62, 63 respectively.

Figure 10:
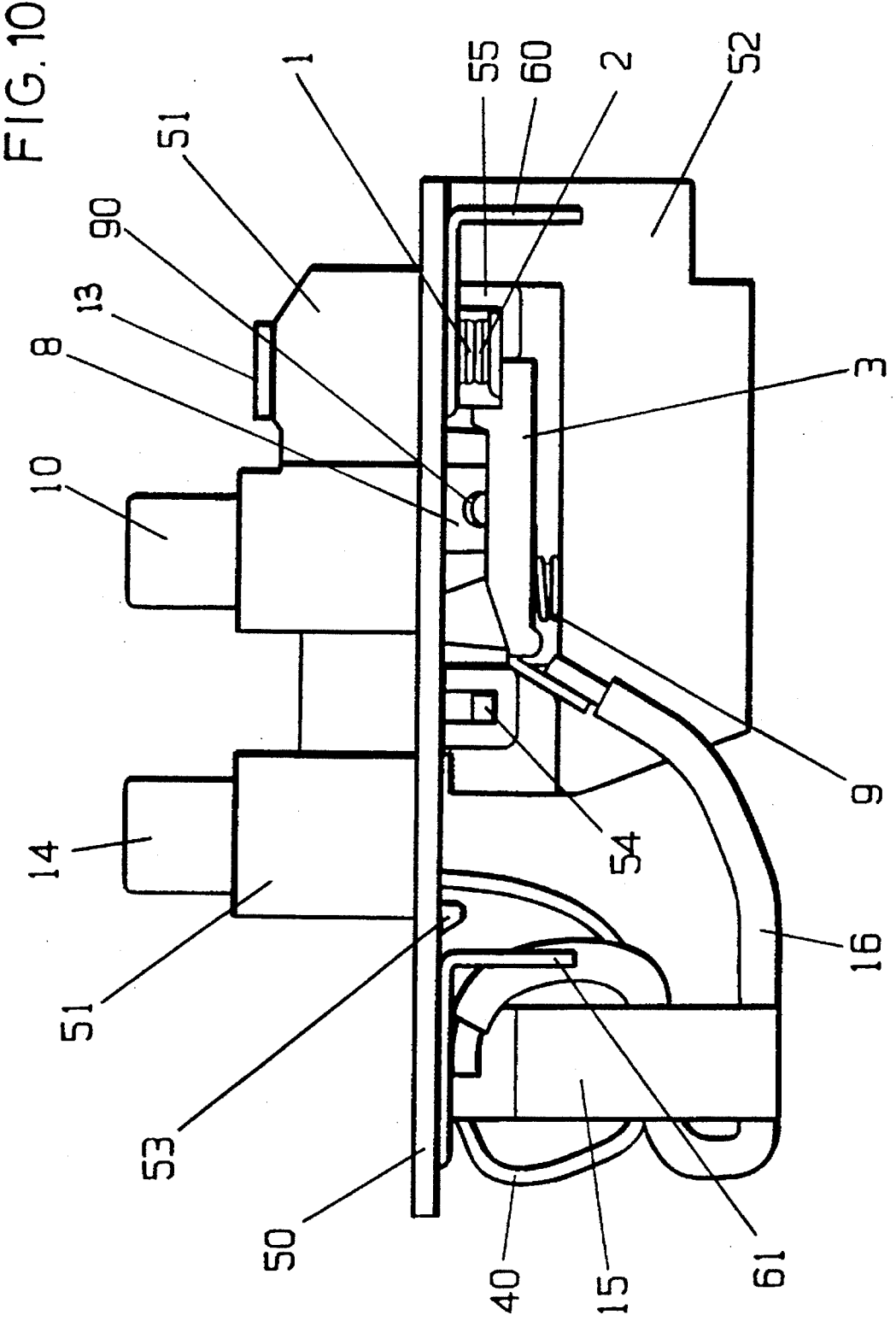
FIG. 10 is a side view of a preferred RCD with the contacts closed.
Figure 11:
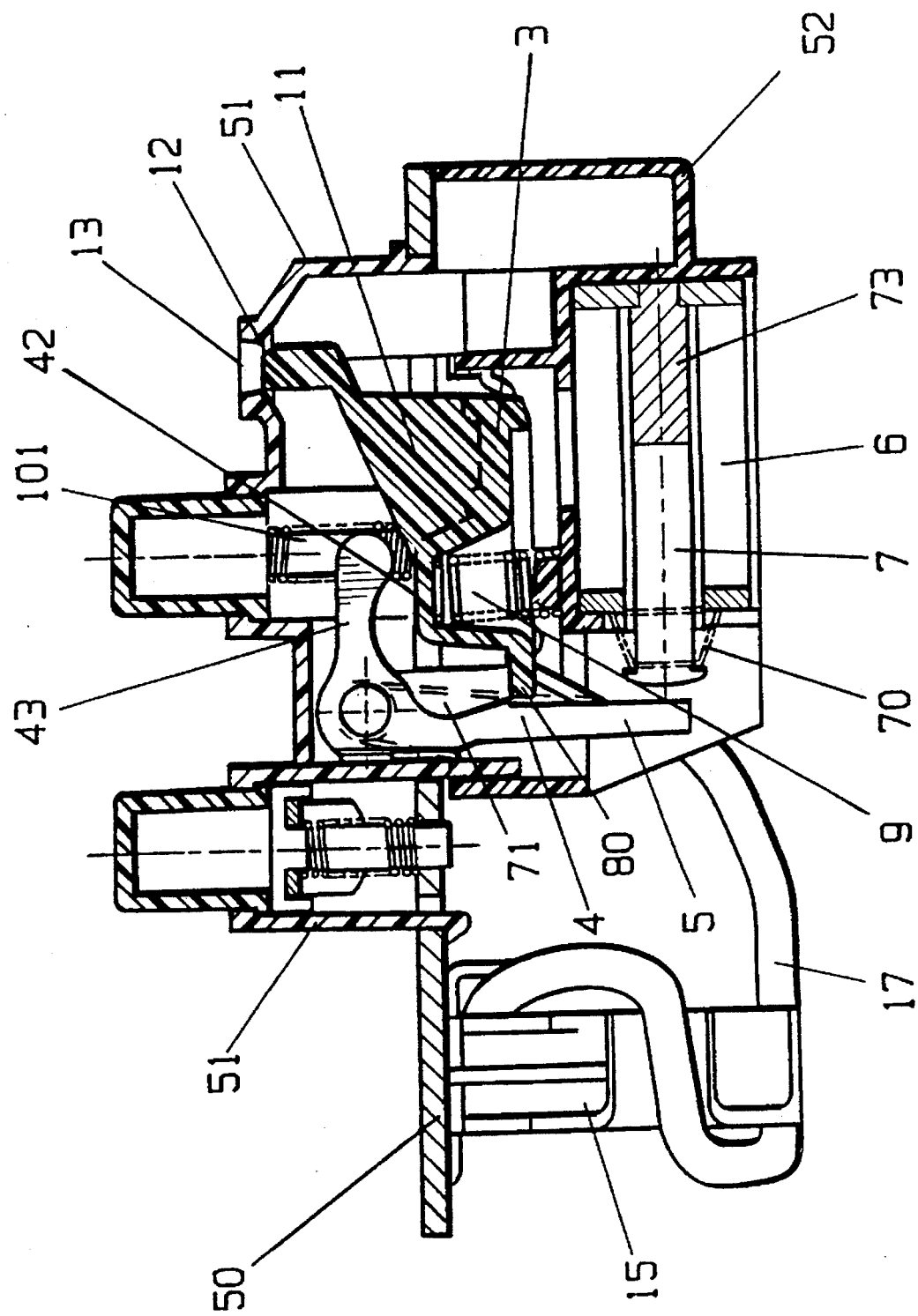
FIG. 11 is a section of the RCD in FIG. 10.

Referring to FIGS. 10 and 11 the RCD is shown with the contact pairs closed. The mains active line would be connected to terminal 60 so that current flows through contacts 1, 2, a plate 85 (shown in FIG. 17), conductor 16 and terminal 61, from there to the load. The mains neutral line and load are similarly connected on the other side of the device which appears identical. End 80 of the lever assembly 3 is engaged by fulcrum 4 under force from spring 9. Fulcrum 8 has two slots 90 which loosely receive axles 81, 82 of the lever assembly. Plunger 7 is held to block 73 within solenoid 6 against spring 70 by a voltage derived from the mains. Flag 12 is apparent in opening 13.

Figure 12:
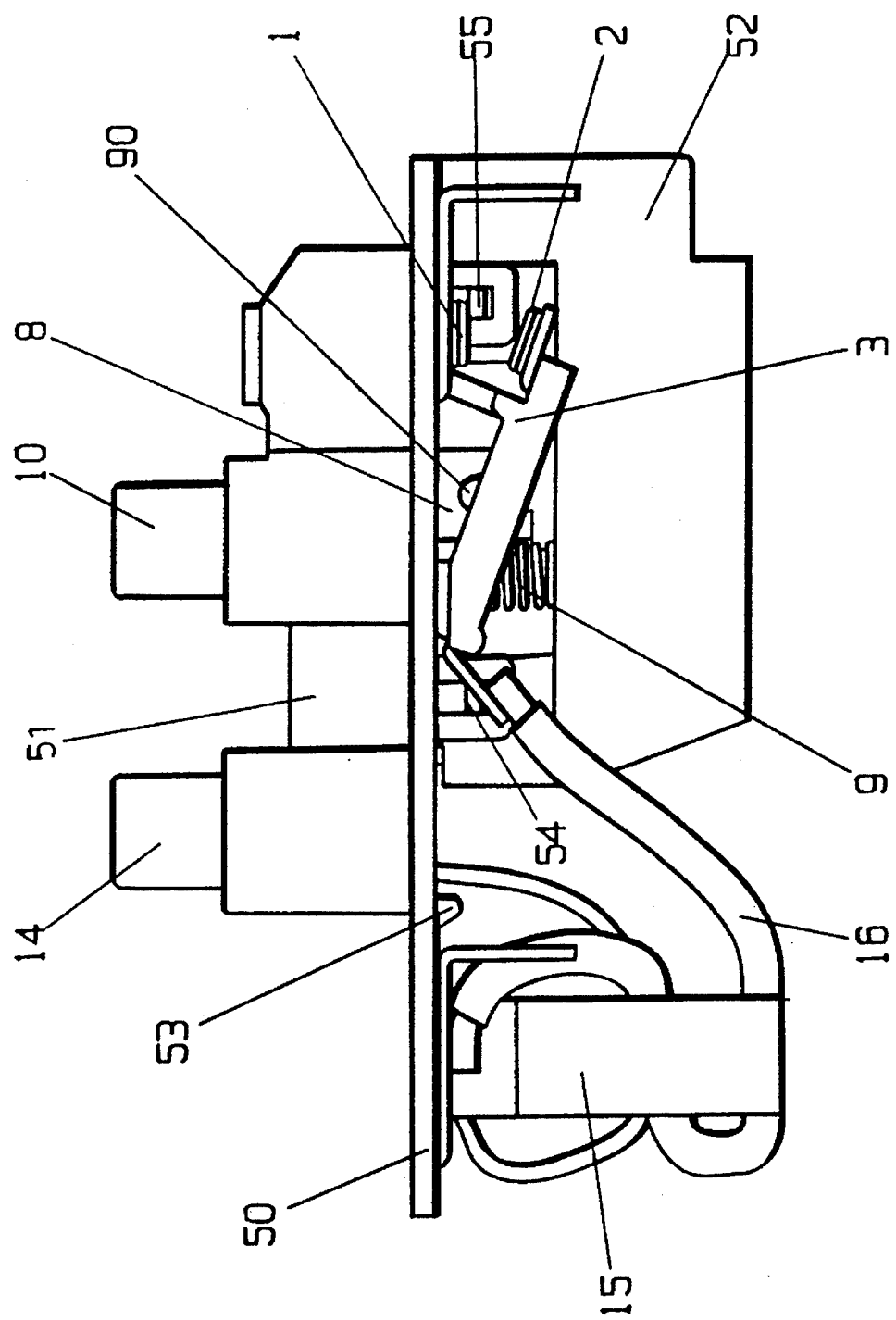
FIG. 12 is a side view of the preferred RCD with the contacts open.
Figure 13:
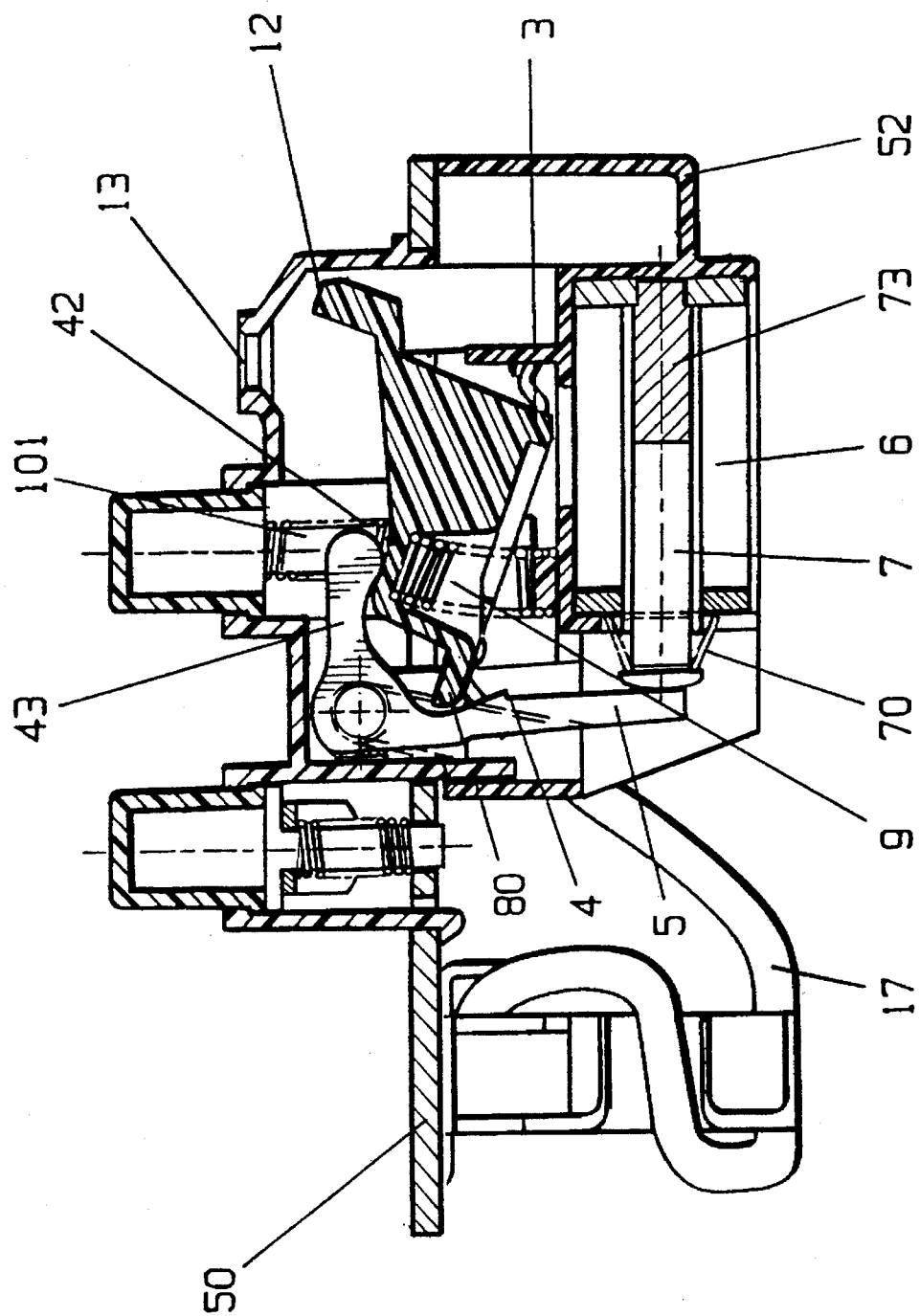
FIG. 13 is a section of the RCD in FIG. 12.

Referring to FIGS. 12 and 13 the RCD is shown tripped with the contact pairs open. Contacts 1 and 2 are separated to interrupt current flow to the load. End 80 of the lever assembly has disengaged from fulcrum 4, and axles 81, 82 (shown in FIG. 17) are engaged in slots 90 on fulcrum 8 under force from spring 9. Plunger 7 was released to deflect arm 5 after de-energisation of the solenoid but is shown restored after action of extension 42 on extension 43. Flag 12 is no longer apparent through opening 13.

Figure 14:
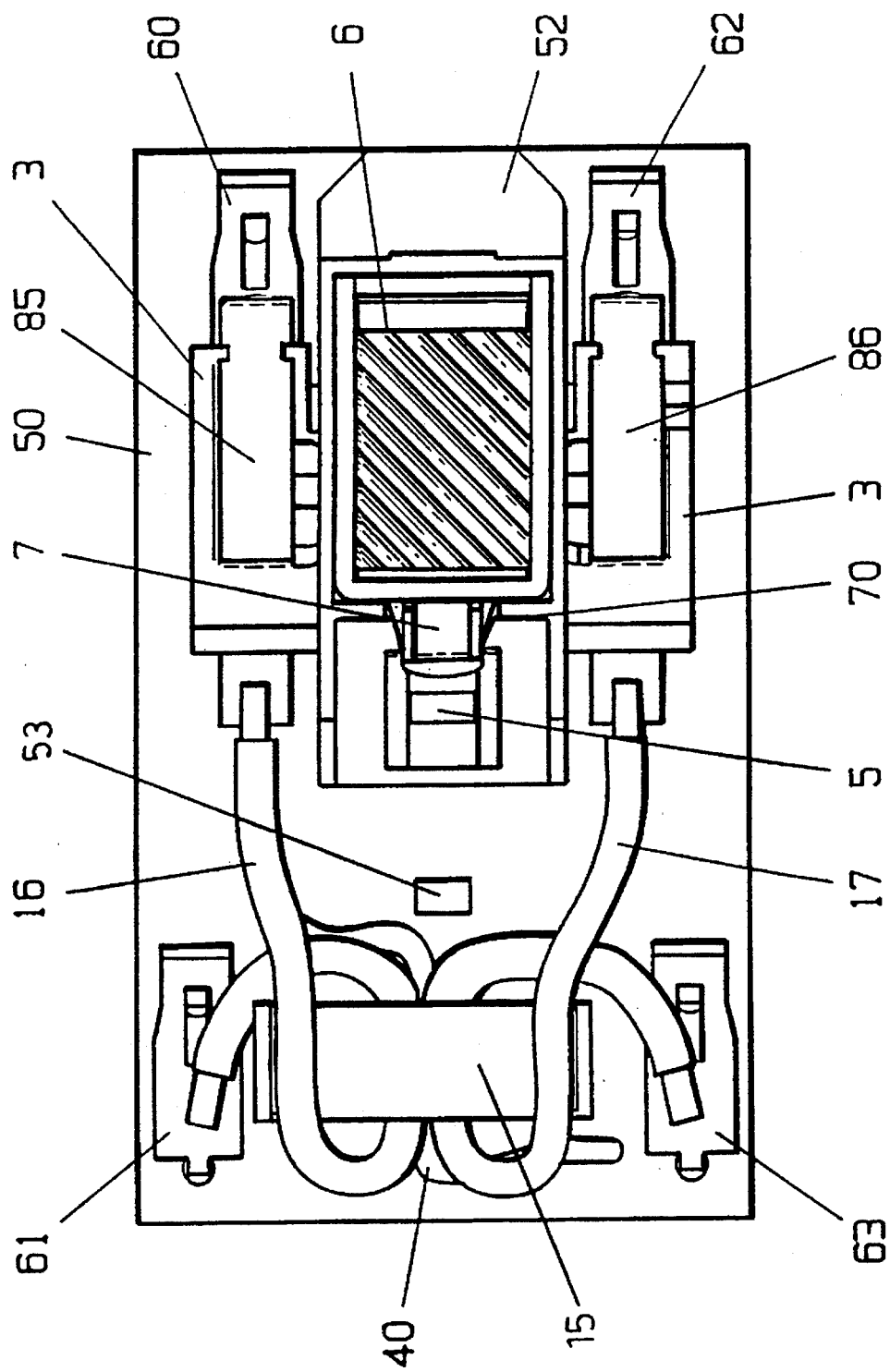
FIG. 14 is an underside view of the preferred RCD.
Figure 15:
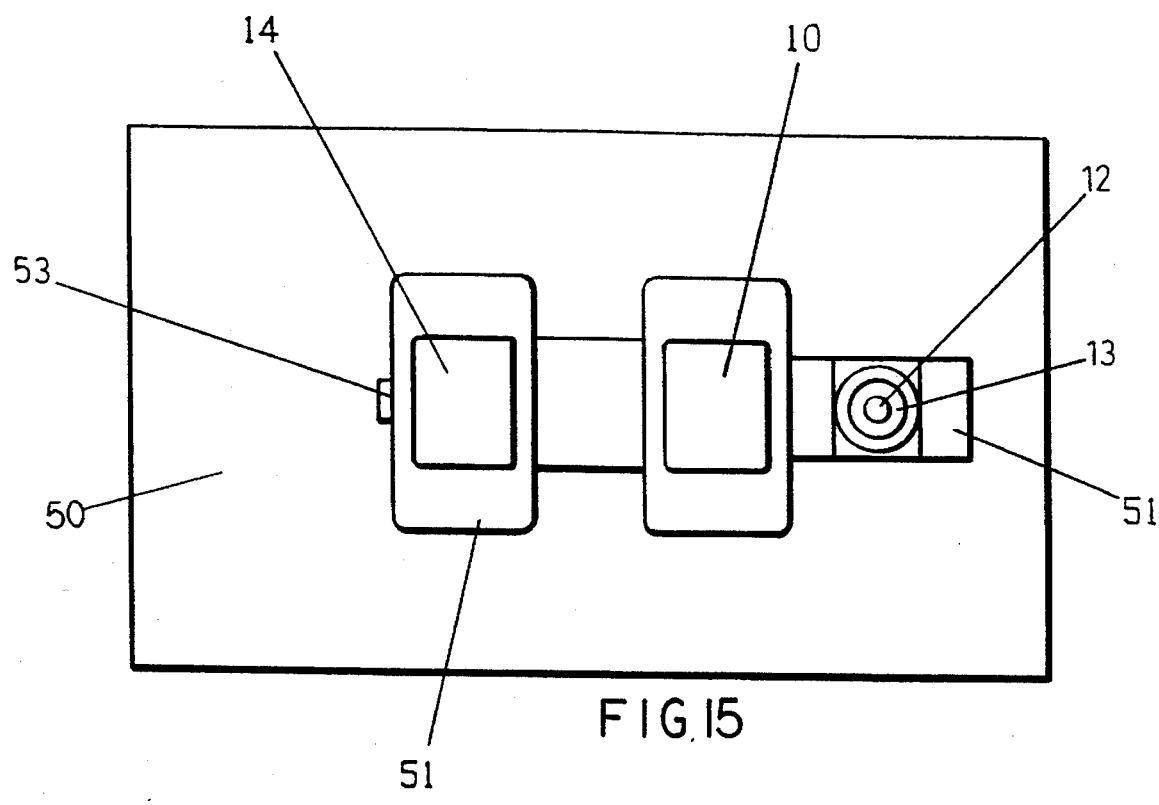
FIG. 15 is an overhead view of the preferred RCD.

Referring to FIGS. 14 and 15 the RCD underside and topside are shown as they appear with the contacts closed. Current passes through terminals 60, 62, plates 85, 86 on lever assembly 3, conductors 16, 17 and terminals 61, 63 as can be seen. Solenoid 6 is energised to hold plunger 7. Flag 12 is apparent through opening 13.

Figure 16:
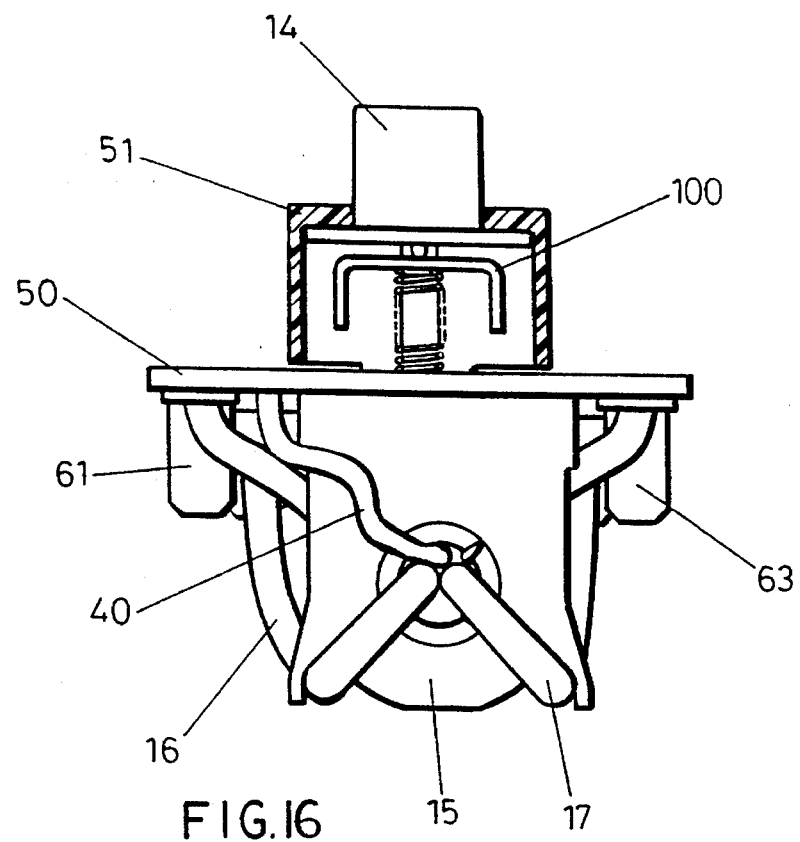
FIG. 16 is an end view of the preferred RCD.

Referring to FIG. 16 an end view of the RCD shows conductors 16, 17 passing through differential transformer 15, and also an inside view of test button 14. Pushing the button takes a predetermined portion of mains current across contact bar 100 and along conductor 40 through the transformer to simulate a fault.

Figure 17:
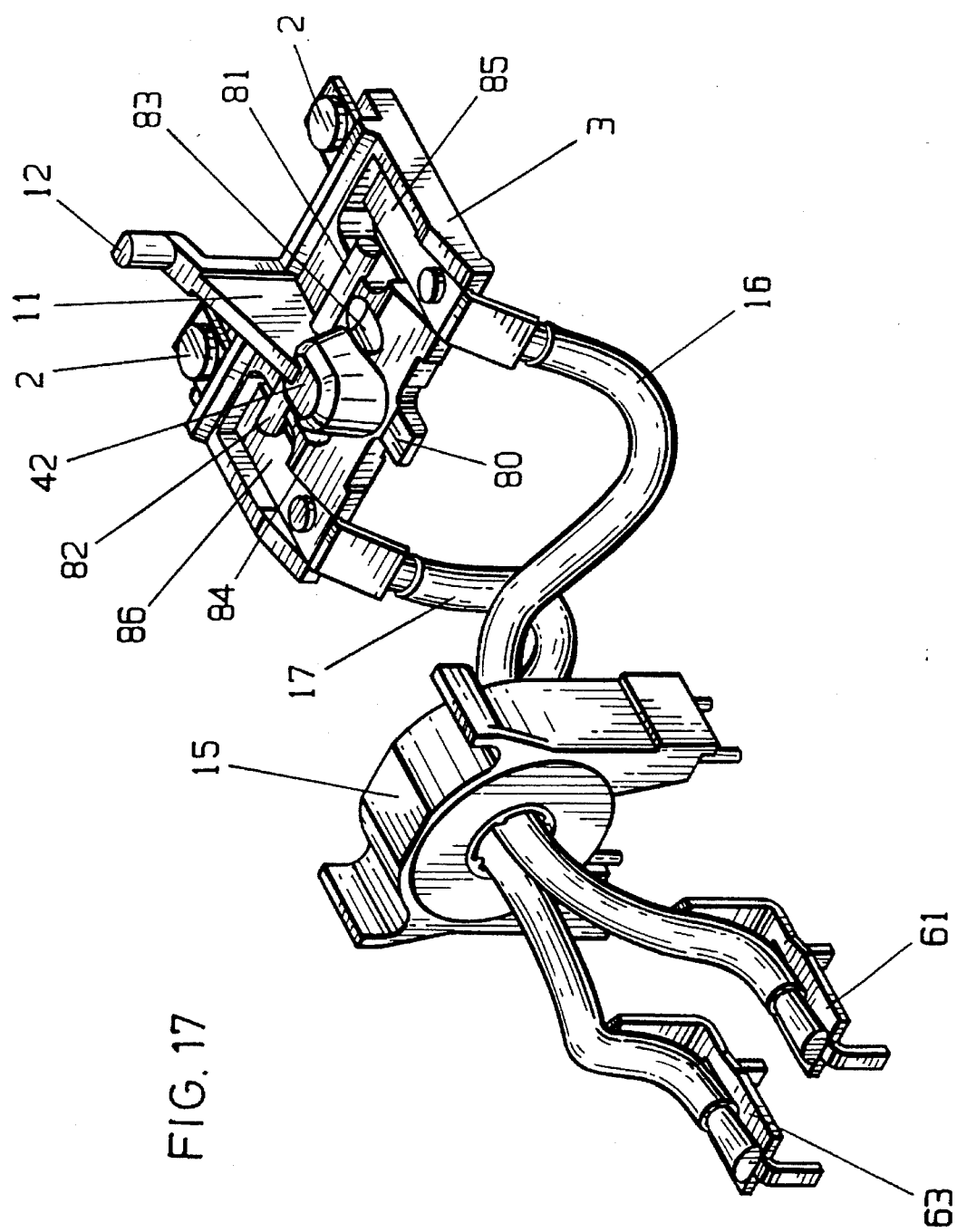
FIG. 17 is an isometric view of the lever assembly and a differential transformer in the preferred RCD.

Referring to FIG. 17 the lever assembly 3 and differential transformer 15 are shown separated from the RCD. The assembly supports movable contacts 2 and plates 85, 86 through which the contacts are connected to conductors 16, 17. Indicator arm 11 and flag 12 are centrally placed between axles 81, 82 which engage fulcrum 8 in FIGS. 10 and 12. Extension 42 is an inverted pocket which engages one end of spring 9 in FIGS. 11 and 13. When the RCD is being set, rod 101 from button 10, also in FIGS. 11 and 13, is pushed down so that two branches (not shown) engage dimples 83, 84. This depresses the entire lever assembly against spring 9 and allows end 80 to engage fulcrum 4 provided the solenoid is energised.

What is claimed is:

1. A switch mechanism that is opened by an undervoltage condition in the event of an electrical fault, wherein a movable contact means from a contact set is supported on a lever assembly with a force being applied against the lever assembly for forcing the assembly against two fulcrums, only one of the fulcrums being operable with the lever assembly at a time and in a manner that movement about a first of said fulcrums causes the contact set to close, and movement about a second of said fulcrums causes the contact set to open, the first fulcrum being movable by an electromechanical means in response to the undervoltage condition to become inoperable allowing the lever assembly to move and operate about the second fulcrum thereby opening the contact set, the lever assembly being movable by a manual reset means so that under a normal voltage condition the second fulcrum becomes inoperable and the lever assembly moves to operate about the first fulcrum thereby closing the contact set.

2. A switch mechanism according to claim 1 wherein the first fulcrum is on a movable arm having an extension upon which the lever assembly acts to restore the plunger.

3. A switch mechanism according to claim 1 wherein the manual reset means exerts a force on the lever assembly between the two fulcrum positions.

4. A switch mechanism according to claim 1 wherein an indicator is mounted on the lever assembly so that the open or closed state of the contact set is apparent.

5. A residual current device incorporating a switch mechanism according to claim 1.

6. A switch mechanism according to claim 1, wherein said manual reset means is separate from each of said fulcrums.

7. A residual current device having a ground fault detection circuit and a switch mechanism that opens in the event of a ground fault and may be closed after removal of the fault, the switch mechanism comprising:

a contact set having fixed and moveable contacts, a lever assembly which supports the moveable contacts, a fixed fulcrum towards and about which the lever assembly is biased during opening of the contacts, manual reset means which pushes the lever assembly away from the fixed fulcrum during closing of the contacts, a moveable fulcrum towards and about which the lever assembly is biased during closing of the contacts, and electromechanical means which releases the moveable fulcrum from the lever assembly during opening of the contacts.

8. A residual current device having a ground fault detection circuit and a switch mechanism that opens in the presence of a ground fault and may be closed after removal of the fault, the switch mechanism comprising:

a contact set having fixed and moveable contacts, a lever assembly which supports the moveable contacts, a first fulcrum towards and about which the lever assembly is biased during closing of the contacts, a second fulcrum towards and about which the lever assembly is biased during opening of the contacts, manual reset means which moves the lever assembly into a position to engage the first fulcrum during closing of the contacts, and electromechanical means which is tripped by detection of the ground fault to displace the first fulcrum away from the lever assembly and is then restored by movement of the lever assembly in relation to the second fulcrum during opening of the contacts.

9. A switch mechanism according to claim 1, wherein the electromechanical means comprises a solenoid and a plunger movable inwardly and outwardly of said solenoid, the plunger being ejected from said solenoid to move the first fulcrum to become inoperable in response to an undervoltage condition, and the plunger then being restored within said solenoid by movement of the lever assembly about the second fulcrum during opening of the contact set.

* * * * *